United States Patent
Chen et al.

(10) Patent No.: US 9,835,441 B2
(45) Date of Patent: Dec. 5, 2017

(54) ABSOLUTE DISTANCE MEASUREMENT APPARATUS AND METHOD USING LASER INTERFEROMETRIC WAVELENGTH LEVERAGE

(71) Applicant: ZHEJIANG SCI-TECH UNIVERSITY, Zhejiang (CN)

(72) Inventors: Benyong Chen, Zhejiang (CN); Liping Yan, Zhejiang (CN); Shihua Zhang, Zhejiang (CN)

(73) Assignee: ZHEJIANG SCI-TECH UNIVERSITY, Zhejiang (CN)

( * ) Notice: Subject to any disclaimer, the term of this patent is extended or adjusted under 35 U.S.C. 154(b) by 0 days.

(21) Appl. No.: 15/304,062

(22) PCT Filed: Mar. 27, 2015

(86) PCT No.: PCT/CN2015/075187
§ 371 (c)(1),
(2) Date: Oct. 13, 2016

(87) PCT Pub. No.: WO2016/154780
PCT Pub. Date: Oct. 6, 2016

(65) Prior Publication Data
US 2017/0038192 A1 Feb. 9, 2017

(51) Int. Cl.
*G01B 11/14* (2006.01)
*G01B 9/02* (2006.01)
*G01B 11/00* (2006.01)

(52) U.S. Cl.
CPC ............ *G01B 11/14* (2013.01); *G01B 9/02* (2013.01); *G01B 9/02007* (2013.01); *G01B 9/02028* (2013.01); *G01B 11/00* (2013.01)

(58) Field of Classification Search
CPC ............ G01B 11/14; G01B 9/02028; G01B 9/02027; G01B 2290/45; G01B 2290/70;
(Continued)

(56) References Cited

U.S. PATENT DOCUMENTS 5,561,525 A * 10/1996 Toyonaga .......... G01B 11/2441
356/512
5,631,736 A   5/1997 Thiel et al.
(Continued)

FOREIGN PATENT DOCUMENTS

CN         1099128        2/1995
CN         101533096      9/2009
(Continued)

OTHER PUBLICATIONS

"International Search Report (Form PCT/ISA/210) of PCT/CN2015/075187", dated Jan. 5, 2016, with English translation thereof, pp. 1-6.

*Primary Examiner* — Michael P Lapage
(74) *Attorney, Agent, or Firm* — JCIPRNET (57) ABSTRACT

An absolute distance measurement apparatus and method using laser interferometric wavelength leverage includes a light source system, a wavelength-leverage laser interferometric system and an interference signal processing and controlling system. The light source system outputs a orthogonally linearly polarized beam with the wavelength $\lambda_1$ and the wavelength $\lambda_2$. The orthogonally linearly polarized beam projects onto the wavelength-leverage laser interferometric system to form the interference beam. The interference beam projects onto the interference signal processing and controlling system. In the wavelength-leverage laser interferometric system, the synthetic wavelength and the single wavelength as well as the measured absolute distance and the moving displacement of the cube-corner prism in the reference arm form a wavelength-leverage absolute distance measurement relationship.

13 Claims, 1 Drawing Sheet

(58) Field of Classification Search
CPC ............ G01B 9/02003; G01B 9/02019; G01B 9/02018; G01B 9/02021; G01B 9/02007
See application file for complete search history.

(56) References Cited

U.S. PATENT DOCUMENTS

| | | | | |
|---|---|---|---|---|
| 2004/0150831 | A1* | 8/2004 | Ray | G01B 9/02027 356/493 |
| 2006/0039006 | A1* | 2/2006 | Van Der Pasch | G02B 5/122 356/493 |
| 2006/0098205 | A1* | 5/2006 | Townley-Smith | G01B 9/02007 356/487 |
| 2009/0310141 | A1* | 12/2009 | Miyata | G01B 9/02007 356/487 |
| 2010/0225924 | A1* | 9/2010 | Kuramoto | G01B 9/02003 356/487 |
| 2011/0211198 | A1* | 9/2011 | Koda | G01B 9/02004 356/499 |
| 2013/0268225 | A1* | 10/2013 | Okuda | G01B 11/14 702/94 |

FOREIGN PATENT DOCUMENTS

| | | |
|---|---|---|
| CN | 101598794 | 12/2009 |
| CN | 102168944 | 8/2011 |
| CN | 102183234 | 9/2011 |
| CN | 103364775 | 10/2013 |
| CN | 104655025 | 5/2015 |

* cited by examiner

ABSOLUTE DISTANCE MEASUREMENT APPARATUS AND METHOD USING LASER INTERFEROMETRIC WAVELENGTH LEVERAGE

CROSS-REFERENCE TO RELATED APPLICATION

This application is a 371 application of an international PCT application serial no. PCT/CN2015/075187, filed on Mar. 27, 2015, the disclosure of which is incorporated herein by reference in its entirety.

BACKGROUND OF THE INVENTION

Technical Field

The present invention relates to an optical measuring apparatus and method and particularly relates to an absolute distance measurement apparatus and method using laser interferometric wavelength leverage.

Description of Related Art

With the development of science and technology, absolute distance measurement of large length with high accuracy are applied more and more widely to high-end equipment manufacturing, spatial engineering, meteorological technique and so on. For example, the measurement of racks of heavy machines, the measurement of beds of large precision machine tools, the measurement of lengths of steam and hydraulic turbine spindles, the measurement of diameters of stators and rotors of water-turbine generator sets of hydropower stations, the measurement of installing positions of aircraft fixtures in the aerospace industry, the monitoring of positions and postures and the high-resolution distance measurement of satellites in satellite formation flying and so on not only demand distance measurement accuracy to reach micrometer level and even lower in the scope from few tens of meters to hundreds of meters but also need these measurement instruments to have high efficiency and good flexibility and to be suitable for measuring conditions without guide rails.

The absolute distance measurement methods are mainly divided into two types: time-of-flight measurement and interferometric measurement. Among the time-of-flight measurement, the distance measurement with laser pulses is limited by picosecond time measurement accuracy, and thus the distance measurement accuracy is in the millimeter level; although the measurement accuracy of the balanced optical cross-correlation based on femtosecond pulses superposition can realize the sub-micrometer order, the measured distance must be an integer multiple of the femtosecond interpulse distance, then arbitrary absolute distance cannot be measured; the phase shifting method achieves the time of flight by measuring the phase delay generated by the measured round-tripping distance of modulated light waves, the measurement resolution depends on the phase resolution of the maximum modulating frequency, and the measured distance is limited by the non-ambiguity distance corresponding to the minimum modulating frequency. The laser interferometric absolute distance measurement mainly includes frequency-sweeping interferometry, femtosecond pulse dispersive interferometry and multiple-wavelength interferometry. For frequency-sweeping interferometry, the variations of the measured distance will induce large errors during the sweep, and the relative uncertainty is $10^{-6}$; the femtosecond pulse dispersive interferometry is limited by the resolution of spectrum analyzer, and the relative uncertainty is $10^{-5}$; the multiple-wavelength interferometry uses multiple wavelengths to constitute a gradually increasing synthetic-wavelength chain and gradually obtains the measured distance by starting from the maximum synthetic wavelength according to the initial estimate of the measured distance and the fractional fringe order corresponding to each synthetic wavelength. In the multiple-wavelength interferometry, the fractional fringe order is usually determined by using beat-wave detection, heterodyne detection, superheterodyne detection and son on, wherein the beat-wave detection is affected by direct-current drift of light intensity, and relative uncertainty is less than $10^{-6}$; in the optical configurations of the heterodyne detection and the superheterodyne detection, heterodyne light sources are affected by frequency modulators and the stability of synthetic wavelength is low, and thus the distance measurement accuracy is difficult to improve.

BRIEF SUMMARY OF THE INVENTION

The present invention aims to disclose an absolute distance measurement apparatus and method using laser interferometric wavelength leverage. According to the one-to-one correspondence between the synthetic wavelength formed by two single wavelengths and a single wavelength, a leverage relation is formed between the measured absolute distance and the moving displacement of the cube-corner prism in the reference arm. The measured absolute distance of large length is obtained by determining the moving displacement of the cube-corner prism in the reference arm. The present invention has the advantages of large measurement range, high measurement accuracy and traceability to the definition of the meter.

The present invention adopts the following technical solutions to solve the technical problem:

1. An absolute distance measurement apparatus using laser interferometric wavelength leverage:

comprising a light source system, a wavelength-leverage laser interferometric system and an interference signal processing and controlling system. The light source system outputs a orthogonally linearly polarized beam with the wavelength $\lambda_1$ and wavelength $\lambda_2$. The orthogonally linearly polarized beam projects onto the wavelength-leverage laser interferometric system to form the interference beam. The interference beam projects onto the interference signal processing and controlling system. The controller in the interference signal processing and controlling system is used for controlling the change of the wavelength $\lambda_2$ in the light source system.

The light source system comprises a first laser, a second laser, a first beam expander, a second beam expander, a first reflector and a first polarizing beam splitter. The linearly polarized beam with a constant wavelength $\lambda_1$ emitted from the first laser passes through the first beam expander and projects onto the first polarizing beam splitter. The linearly polarized beam with a variable wavelength $\lambda_2$ emitted from the second laser, whose polarization direction is perpendicular to that of the beam from the first laser, passes through the second beam expander, is reflected by the first reflector and projects onto the first polarizing beam splitter. The linearly polarized beam with the constant wavelength $\lambda_1$ transmitted by the first polarizing beam splitter and the linearly polarized beam with the variable wavelength $\lambda_2$ reflected by the first polarizing beam splitter combine one orthogonally linearly polarized beam.

The wavelength-leverage laser interferometric system comprises a first beam splitter, a second polarizing beam splitter, a first cube-corner prism, a second beam splitter, a first shutter, a second shutter, a second reflector, a third reflector, a third beam splitter, a second cube-corner prism and a third cube-corner prism. Being incident on the first beam splitter, the orthogonally linearly polarized beam is divided into the reflected reference beam and the transmitted measurement beam. The reflected reference beam projects onto the second polarizing beam splitter, wherein the linearly polarized beam with the wavelength $\lambda_2$ is reflected twice by the second polarizing beam splitter and projects onto the first beam splitter, and the linearly polarized beam with the wavelength $\lambda_1$ passes through the second polarizing beam splitter, projects onto the first cube-corner prism, returns after being reflected, and projects onto the first beam splitter after passing through the second polarizing beam splitter again. Being incident on the second beam splitter, the transmitted measurement beam is divided into the reflected near-end measurement beam and the transmitted far-end measurement beam. The near-end measurement beam projects onto the first beam splitter after passing through the first shutter, the second reflector, the second cube-corner prism and the third beam splitter in sequence. And the far-end measurement beam projects onto the first beam splitter after passing through the second shutter, the third cube-corner prism, the third reflector and the third beam splitter in sequence. Being reflected by the first beam splitter, the near-end or far-end measurement beam recombines with the reference beam transmitted by the first beam splitter to form the interference beam.

The interference signal processing and controlling system comprises a third polarizing beam splitter, a first photodetector, a second photodetector, a data acquisition module, a computer and a controller. The interference beam from the wavelength-leverage laser interferometric system projects onto the third polarizing beam splitter. The interference beam with the wavelength $\lambda_2$ reflected by the third polarizing beam splitter is received by the first photodetector, and the interference beam with the wavelength $\lambda_1$ transmitted by the third polarizing beam splitter is received by the second photodetector. The interference signals output by the two photodetectors are respectively sent to the data acquisition module, and then transmitted to the computer after being processed by the data acquisition module. According to the calculated result, the computer changes the value of the wavelength $\lambda_2$ emitted from the second laser by means of the controller.

In the light source system, the wavelength $\lambda_1$ of the laser beam emitted from the first laser is a constant value and the wavelength $\lambda_2$ of the laser beam emitted from the second laser is a variable value.

In the wavelength-leverage laser interferometric system, the reference arm is composed of the second polarizing beam splitter and the first cube-corner prism while the measurement arm is composed of the second beam splitter, the first shutter, the second shutter, the second reflector, the third reflector, the third beam splitter, the second cube-corner prism and the third cube-corner prism.

In the wavelength-leverage laser interferometric system, there is a one-to-one correspondence between the synthetic wavelength $\lambda_S$ formed by the linearly polarized beams with the wavelengths $\lambda_1$ and $\lambda_2$ in the measurement arm and the wavelength $\lambda_1$ of the linearly polarized beam projecting onto the first cube-corner prism in the reference arm. The measured absolute distance in the measurement arm and the moving displacement of the first cube-corner prism in the reference arm form a leverage relationship.

2. An absolute distance measurement method using laser interferometric wavelength leverage: the method adopts the apparatus to perform measurement, and the specific steps are as follows:

1) The first laser emits the linearly polarized beam with the wavelength $\lambda_1$. Controlling the second laser to emit the linearly polarized beam with the wavelength $\lambda_2$ makes one half of the primary synthetic wavelength $\lambda_{S1}$ formed by the wavelengths $\lambda_1$ and $\lambda_2$ be larger than the measured absolute distance L which is the distance between the second cube-corner prism and the third cube-corner prism;

2) Adjust the open and close states of the first shutter and the second shutter. Move the first cube-corner prism along the axial direction of light path. Establish the wavelength-leverage relationship. The primary coarse measurement value of the measured absolute distance is achieved;

3) Keep the wavelength $\lambda_1$ output from the first laser constant. The computer changes the wavelength $\lambda_2$ output from the second laser by means of the controller so that the wavelength $\lambda_1$ and the wavelength $\lambda_2$ form a series of synthetic wavelengths $\lambda_{S2}, \lambda_{S3}, \ldots, \lambda_{Si}, \ldots, \lambda_{Sn}$. The measurement is performed repeatedly with respect to each change of the wavelength $\lambda_2$. The fractional fringe order $\epsilon_{Si}$ and the integral fringe order $M_{Si}$ of the synthetic wavelength $\lambda_{Si}$ included in the measured absolute distance L are obtained through calculation;

4) According to the synthetic wavelength $\lambda_{Si}$ and its fractional fringe order $\epsilon_{Si}$ and integral fringe order $M_{Si}$ obtained in the above steps, the computer calculates each estimate value of the measured absolute distance L during each measurement. The measured absolute distance L is obtained through calculation. Then the measurement of absolute distance using laser interferometric wavelength leverage is realized.

Step 2) specifically includes;

2.1) When the first shutter is opened and the second shutter is closed, the near-end measurement beam returned from the second cube-corner prism and the reference beam form the interference signals. Moving the first cube-corner prism along the axial direction of light path makes the phase difference $\Delta\phi$ between the interference signals of wavelengths $\lambda_2$ and $\lambda_1$ detected respectively by the first photodetector and the second photodetector be equal to zero;

2.2) When the first shutter is closed and the second shutter is opened, the far-end measurement beam returned from the third cube-corner prism and the reference beam form the interference signals. The phase difference $\Delta\phi$ between the two interference signals received by the first photodetector and the second photodetector is changed. Moving again the first cube-corner prism along the axial direction of light path makes the phase difference $\Delta\phi$ be equal to zero. The moving displacement of the first cube-corner prism is recorded as $\Delta l$;

2.3) The wavelength-leverage relationship among the primary synthetic wavelength $\lambda_{S1}$, the wavelength $\lambda_1$ output from the first laser, the measured absolute distance L and the moving displacement $\Delta l$ of the first cube-corner prism is established as follows:

$$\frac{L}{\lambda_{S1}} = \frac{\Delta l}{\lambda_1}$$

where $\lambda_{S1} = \lambda_1 \lambda_2 / |\lambda_1 - \lambda_2|$ is the primary synthetic wavelength formed by the wavelengths $\lambda_1$ and $\lambda_2$. $\lambda_1$ and $\lambda_2$ are the wavelengths output from the first laser and the second laser, respectively;

According to the wavelength-leverage relationship, the primary coarse measurement value $L_1$ of the measured absolute distance is calculated by the computer using the following equation:

$$L_1 = \frac{\lambda_{S1}}{\lambda_1} \cdot \Delta l.$$

Step 3) specifically includes:

A series of synthetic wavelengths meets $\lambda_{S2} > \lambda_{S3} > \ldots > \lambda_{Sn}$, and each synthetic wavelength $\lambda_{Si}$ meets $$\lambda_{Si} > 4u(L_{i-1}'), i=2,3,\ldots,n$$

where i represents the sequence number of measurement times, n represents the total number of measurement times, $L_{i-1}'$ is the estimate value of the measured distance, and $u(L_{i-1}')$ is the measurement uncertainty of the estimate value $L_{i-1}'$ of the measured distance when the synthetic wavelength is $\lambda_{Si-1}$; when i=2, $L_{i-1}'=L_1$, namely $L_1'=L_1$;

For each synthetic wavelength $\lambda_{Si}$, repeat Step 2). When the wavelength $\lambda_2$ of the second laser is changed, the moving displacement of the first cube-corner prism is recorded as $\Delta l_i$ during each measurement. The following approach is adopted to perform measurement during each measurement:

According to the wavelength-leverage relationship, the coarse measurement value $L_i$ of the measured absolute distance corresponding to the fractional part of the synthetic wavelength $\lambda_{Si}$ is calculated by the computer using the following equation:

$$L_i = \frac{\lambda_{Si}}{\lambda_1} \cdot \Delta l_i$$

With the coarse measurement value $L_i$ of the measured absolute distance, the fractional fringe order $\epsilon_{Si}$ of the synthetic wavelength $\lambda_{Si}$ included in the measured absolute distance L is calculated by the computer using the following equation:

$$\varepsilon_{Si} = \frac{2L_i}{\lambda_{Si}}$$

Then, with the estimate value $L_{i-1}'$ of the measured absolute distance and the fractional fringe order $\epsilon_{Si}$ of the synthetic wavelength $\lambda_{Si}$, the integral fringe order $M_{Si}$ of the synthetic wavelength $\lambda_{Si}$ included in the measured absolute distance is calculated by the computer using the following equation:

$$M_{Si} = \operatorname{int}\left[\frac{2L_{i-1}'}{\lambda_{Si}} + 0.5 - \varepsilon_{Si}\right]$$

where int[ ] is rounded down.

Step 4) specifically includes:

4.1) For the measuring process with respect to i=2, 3, ..., n, each estimate value $L_i'$ of the measured absolute distance L is calculated by the computer using the following equation:

$$L_i' = (M_{Si} + \varepsilon_{Si}) \cdot \frac{\lambda_{Si}}{2}$$

When $4u(L_n') < \lambda_1$ is satisfied, where $u(L_n')$ is the measurement uncertainty of the estimate value $L_n'$ of the measured absolute distance when the final synthetic wavelength is $\lambda_{Sn}$, the measured absolute distance L is calculated by the computer using the following equation:

$$L = (M_n + \varepsilon_n) \cdot \frac{\lambda_1}{2}$$

where $M_n$ represents the integral fringe order of the wavelength $\lambda_1$ included in the measured absolute distance L, $\epsilon_n$ represents the fractional fringe order of the wavelength $\lambda_1$ included in the measured absolute distance L, and $M_n$ and $\epsilon_n$ are respectively calculated by using the following equations:

$$M_n = \operatorname{int}\left[\frac{2L_n'}{\lambda_1} + 0.5 - \varepsilon_n\right]$$

$$\varepsilon_n = \frac{2\Delta l_n}{\lambda_1}$$

where $L_n'$ is the estimate value of the measured absolute distance L and $\Delta l_n$ is the moving displacement of the first cube-corner prism in the final measurement.

The wavelength $\lambda_1$ output from the first laser is a fixed wavelength and the wavelength $\lambda_2$ output from the second laser can be changed.

Compared with the background of the invention, the present invention has the advantages that:

(1) Using the wavelength leverage principle, the measured distance of large length is converted into the measurement of easily detected displacement of the cube-corner prism in the reference arm, instead of acquiring the fractional fringe order of the synthetic wavelength through phase determination. The method is easy to realize;

(2) The method can realize the absolute measurement of arbitrary distance. And when the synthetic wavelength is gradually decreased and transited to the single wavelength, the measurement accuracy of the measured distance can reach nanometer level. Thus the method has high measurement accuracy.

(3) The method can realize the transition from synthetic wavelength to single wavelength. The method is simple in structure, low in cost and convenient to use.

The present invention is mainly applied to the measurement of absolute distance of large length or large size with high accuracy in the field of large precision equipment manufacturing, spatial engineering and meteorological technique.

BRIEF DESCRIPTION OF THE DRAWINGS

In the figures: 10. first laser, 11. second laser, 12. first beam expander, 13. second beam expander, 14. first reflector, 15. first polarizing beam splitter, 20. first beam splitter, 21. second polarizing beam splitter, 22. first cube-corner prism, 23. second beam splitter, 24. first shutter, 25. second shutter, 26. second reflector, 27. third reflector, 28. third beam splitter, 29. second cube-corner prism, 210. third cube-corner prism, 30. third polarizing beam splitter, 31.

first photodetector, 32. second photodetector, 33. data acquisition module, 34. computer, and 35. controller.

DETAILED DESCRIPTION OF THE INVENTION

The present invention is further described in details hereinafter with the Figures and Embodiments.

Figure 1:
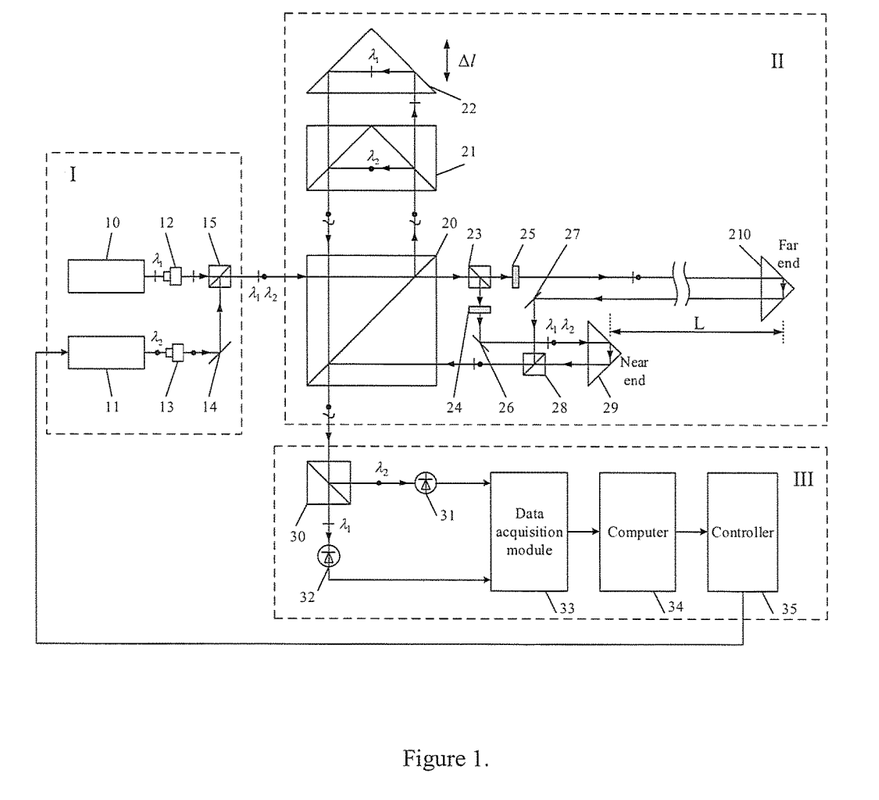
FIG. 1 is the optical configuration of the present invention.

As shown in FIG. 1, the apparatus of the present invention comprises a light source system I, a wavelength-leverage laser interferometric system II and an interference signal processing and controlling system III. The light source system I outputs a orthogonally linearly polarized beam with the wavelength $\lambda_1$ and wavelength $\lambda_2$. The orthogonally linearly polarized beam projects onto the wavelength-leverage laser interferometric system II to form the interference beam. The interference beam projects onto the interference signal processing and controlling system III. The controller 35 in the interference signal processing and controlling system III is used for controlling the change of the wavelength $\lambda_2$ in the light source system I.

The light source system I comprises a first laser 10, a second laser 11, a first beam expander 12, a second beam expander 13, a first reflector 14 and a first polarizing beam splitter 15. The linearly polarized beam with a constant wavelength $\lambda_1$ and the polarization direction parallel to the page plane emitted from the first laser 10 passes through the first beam expander 12 and projects onto the first polarizing beam splitter 15. The linearly polarized beam with a variable wavelength $\lambda_2$ and the polarization direction perpendicular to the page plane emitted from the second laser 11 passes through the second beam expander 13, is reflected by the first reflector 14 and projects onto the first polarizing beam splitter 15. The polarization direction of the beam from the first laser 10 is perpendicular to that of the beam from the second laser 11. In FIG. 1, the vertical short line in the light path represents the beam with the wavelength $\lambda_1$ whose polarization direction is parallel to the page plane, and the black dot represents the beam with the wavelength $\lambda_2$ whose polarization direction is perpendicular to the page plane. The linearly polarized beam with the wavelength $\lambda_1$ transmitted by the first polarizing beam splitter 15 and the linearly polarized beam with the wavelength $\lambda_2$ reflected by the first polarizing beam splitter 15 combine one orthogonally linearly polarized beam.

The wavelength-leverage laser interferometric system II comprises a first beam splitter 20, a second polarizing beam splitter 21, a first cube-corner prism 22, a second beam splitter 23, a first shutter 24, a second shutter 25, a second reflector 26, a third reflector 27, a third beam splitter 28, a second cube-corner prism 29 and a third cube-corner prism 210. Being incident on the first beam splitter 20, the orthogonally linearly polarized beam is divided into the reflected reference beam and the transmitted measurement beam. The reference beam projects onto the second polarizing beam splitter 21, wherein the linearly polarized beam with the wavelength $\lambda_2$ is reflected twice by the second polarizing beam splitter 21 and projects onto the first beam splitter 20, and the linearly polarized beam with the wavelength $\lambda_2$ passes through the second polarizing beam splitter 21, projects onto the first cube-corner prism 22, returns after being reflected, and projects onto the first beam splitter 20 after passing through the second polarizing beam splitter 21 again. Being incident on the second beam splitter 23, the measurement beam is divided into the reflected near-end measurement beam and the transmitted far-end measurement beam. The near-end measurement beam projects onto the first beam splitter 20 after passing through the first shutter 24, the second reflector 26, the second cube-corner prism 29 and the third beam splitter 28 in sequence. And the far-end measurement beam projects onto the first beam splitter 20 after passing through the second shutter 25, the third cube-corner prism 210, the third reflector 27 and the third beam splitter 28 in sequence. Being reflected by the first beam splitter 20, the near-end or far-end measurement beam recombines with the reference beam transmitted by the first beam splitter 20 to form the interference beam.

The interference signal processing and controlling system III comprises a third polarizing beam splitter 30, a first photodetector 31, a second photodetector 32, a data acquisition module 33, a computer 34 and a controller 35. The interference beam from the wavelength-leverage laser interferometric system II projects onto the third polarizing beam splitter 30. The interference beam with the wavelength $\lambda_2$ reflected by the third polarizing beam splitter 30 is received by the first photodetector 31, and the interference beam with the wavelength $\lambda_1$ transmitted by the third polarizing beam splitter 30 is received by the second photodetector 32. The interference signals output by the two photodetectors are respectively sent to the data acquisition module 33, and then transmitted to the computer 34 after being processed by the data acquisition module 33. According to the calculated result, the computer 34 changes the value of the wavelength $\lambda_2$ emitted from the second laser 11 by means of the controller 35.

In the light source system I, the wavelength $\lambda_1$ of the beam emitted from the first laser 10 is a constant value and the wavelength $\lambda_2$ of the beam emitted from the second laser 11 is a variable value.

In the wavelength-leverage laser interferometric system II, the reference arm is composed of the second polarizing beam splitter 21 and the first cube-corner prism 22 while the measurement arm is composed of the second beam splitter 23, the first shutter 24, the second shutter 25, the second reflector 26, the third reflector 27, the third beam splitter 28, the second cube-corner prism 29 and the third cube-corner prism 210.

In the wavelength-leverage laser interferometric system II, there is a one-to-one correspondence between the synthetic wavelength $\lambda_S$ formed by the linearly polarized beams with the wavelengths $\lambda_1$ and $\lambda_2$ in the measurement arm and the wavelength $\lambda_1$ of the linearly polarized beam projecting onto the first cube-corner prism 22 in the reference arm. The measured absolute distance in the measurement arm and the moving displacement of the first cube-corner prism 22 in the reference arm form a leverage relationship.

In the wavelength-leverage laser interferometric system II, when the first shutter 24 is opened and the second shutter 25 is closed, the near-end measurement beam incident on the first beam splitter 20 and the reference beam incident on the first beam splitter 20 form interference. When the first shutter 24 is closed and the second shutter 25 is opened, the far-end measurement beam incident on the first beam splitter 20 and the reference beam incident on the first beam splitter 20 form interference. That is, the near-end measurement beam and the far-end measurement beam respectively interfere with the reference beam by alternately opening and closing the first shutter 24 and the second shutter 25.

In the embodiment of the present invention, the first laser 10, which is one tunable diode laser with the model of DL Pro 633 made by Toptica Company from Germany, emits the constant wavelength $\lambda_1$ of 631 nm. The second laser 11, which is another tunable diode laser with the model of DL Pro 633 made by Toptica Company from Germany, emits the wavelength $\lambda_2$ with the range of 630 nm-637 nm. The first photodetector 31 and the second photodetector 32 are PIN photodetectors with the model of S09105 made by Beijing Suoyang Photoelectric Technology Co., Ltd. The data acquisition module 33 is a data acquisition card with the model of PCI-9820 made by Adlink Technology Company. The computer 34 is a desktop computer with the model of Pro4500 made by the HP Company. And the controller 35 is a controller with the model of Digilock110 made by Toptica Company from Germany.

Figure 2:
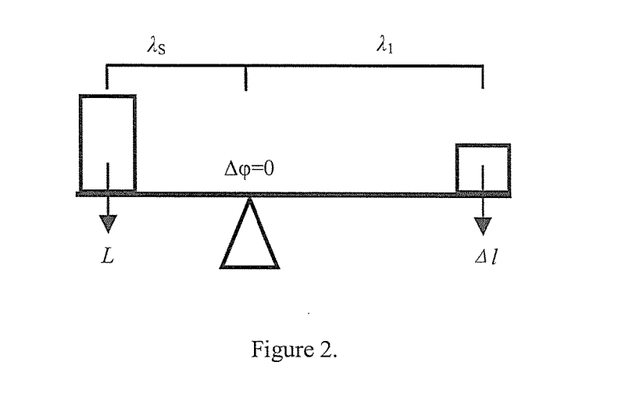
FIG. 2 is the schematic diagram of the absolute distance measurement using wavelength leverage of the present invention.

Combined with FIG. 2, the specific implementation for measuring absolute distance using laser interferometric wavelength leverage includes the following steps:

1) The first laser 10 emits the linearly polarized beam with a constant wavelength $\lambda_1$. Controlling the second laser 11 to emit the linearly polarized beam with a variable wavelength $\lambda_2$ makes one half of the primary synthetic wavelength $\lambda_{S1}$ formed by the wavelengths $\lambda_1$ and $\lambda_2$ be larger than the measured absolute distance L, which is the distance between the second cube-corner prism 29 and the third cube-corner prism 210;

2) Adjust the open and close states of the first shutter 24 and the second shutter 25. Move the first cube-corner prism 22 along the axial direction of light path. Establish the wavelength-leverage relationship. The primary coarse measurement value of the measured absolute distance is achieved;

2.1) When the first shutter 24 is opened and the second shutter 25 is closed, the near-end measurement beam returned from the second cube-corner prism 29 interferes with the reference beam. The interference signals of the wavelength $\lambda_2$ and wavelength $\lambda_1$ detected respectively by the first photodetector 31 and the second photodetector 32 are respectively shown as follows:

$$\varphi_2 = 4\pi \frac{L_R}{\lambda_2} \quad (1)$$

$$\varphi_1 = 4\pi \left( \frac{L_R}{\lambda_1} - \frac{L_M}{\lambda_1} \right) \quad (2)$$

where $\phi_1$ and $\phi_2$ are the phases of the interference signals of the wavelengths $\lambda_1$ and $\lambda_2$ detected by the first photodetector 31 and the second photodetector 32, respectively. $L_R$ is the distance difference between the first beam splitter 20 to the second cube-corner prism 29 and the first beam splitter 20 to the second polarizing beam splitter 21. And $L_M$ is the distance between the second polarizing beam splitter 21 and the first cube-corner prism 22. $\lambda_1$ and $\lambda_2$ are the laser wavelengths in the air, $\lambda_1 = \lambda_{10}/n_1$ and $\lambda_2 = \lambda_{20}/n_2$ ($\lambda_{10}$ and $\lambda_{22}$ are the laser wavelengths in the vacuum, $n_1$ and $n_2$ are the refractive index of air, $n_1$ and $n_2$ are calculated with the Edlen equation by measuring the temperature, humidity, pressure and $CO_2$ concentration of the air);

Moving the first cube-corner prism 22 along the axial direction of light path makes the phase difference between the two interference signals determined by the data acquisition module 33 be equal to zero, that is, there is:

$$\Delta\varphi = \varphi_2 - \varphi_1 = 4\pi \left( \frac{L_R}{\lambda_{S1}} + \frac{L_{M1}}{\lambda_1} \right) = 0 \quad (3)$$

where $L_{M1}$ is the distance between the second polarizing beam splitter 21 and the first cube-corner prism 22 with respect to the primary synthetic wavelength; $\lambda_{S1} = \lambda_1 \lambda_2 / |\lambda_1 - \lambda_2|$ is the primary synthetic wavelength formed by $\lambda_1$ and $\lambda_2$;

2.2) When the first shutter 24 is closed and the second shutter 25 is opened, the far-end measurement beam returned from the third cube-corner prism 210 interferes with the reference beam. As the measured distance L is introduced, the phase difference $\Delta\phi'$ between the two interference signals is changed as follows:

$$\Delta\varphi' = 4\pi \left( \frac{L_R + L}{\lambda_{S1}} + \frac{L_{M1}}{\lambda_1} \right) \quad (4)$$

In order to measure the measured distance L, the first cube-corner prism 22 is moved a smaller distance $\Delta l$ (less than $\lambda_1/2$) along the axial direction of light path, namely $L_{M1} \to L_{M1} \pm \Delta l$. The phase difference $\Delta\phi''$ between the two interference signals is changed as follows:

$$\Delta\varphi'' = 4\pi \left( \frac{L_R + L}{\lambda_{S1}} + \frac{L_{M1} \pm \Delta l}{\lambda_1} \right) \quad (5)$$

When $\lambda_2 > \lambda_1$, the first cube-corner prism 22 moves towards the second polarizing beam splitter 21, and the sign before $\Delta l$ is plus. When $\lambda_2 < \lambda_1$, the first cube-corner prism 22 moves far away from the second polarizing beam splitter 21, and the sign before $\Delta l$ is minus;

2.3) The smaller distance $\Delta l$ moved by the first cube-corner prism 22 shall satisfy to make $\Delta\phi'' = 0$. According to Eq. (3) and Eq. (5), the wavelength-leverage relationship among the primary synthetic wavelength $\lambda_{S1}$, the wavelength $\lambda_1$, the measured absolute distance L and the moving displacement $\Delta l$ of the first cube-corner prism 22 is established as follows:

$$\frac{L}{\lambda_{S1}} = \frac{\Delta l}{\lambda_1} \quad (6)$$

The wavelength-leverage relationship is shown in FIG. 2. The primary coarse measurement value $L_1$ of the measured absolute distance is calculated by the computer 34 as follows:

$$L_1 = \frac{\lambda_{S1}}{\lambda_1} \cdot \Delta l \quad (7)$$

3) Keep the wavelength $\lambda_1$ output from the first laser 10 constant. The computer 34 changes the wavelength $\lambda_2$ output from the second laser 11 by means of the controller 35 so that the wavelength $\lambda_1$ and the wavelength $\lambda_2$ form a series of synthetic wavelengths $\lambda_{S2}, \lambda_{S3}, \ldots, \lambda_{Si}, \ldots, \lambda_{Sn}$. The measurement is performed repeatedly with respect to each change of the wavelength $\lambda_2$. The fractional fringe order $\epsilon_{Si}$ and the integral fringe order $M_{Si}$ of the synthetic wavelength $\lambda_{Si}$ included in the measured absolute distance L are obtained through calculation;

A series of synthetic wavelengths meets $\lambda_{S2} > \lambda_{S3} > \ldots > \lambda_{Sn}$, and each synthetic wavelength $\lambda_{Si}$ meets:

$$\lambda_{Si} > 4u(L_{i-1}'), i=2,3,\ldots,n$$

where i represents the sequence number of measurement times, n represents the total number of measurement times, $L_{i-1}'$ is the estimate value of the measured distance, and $u(L_{i-1}')$ is the measurement uncertainty of the estimate value $L_{i-1}'$ of the measured distance when the synthetic wavelength is $\lambda_{Si-1}$ (when $i=L_{i-1}'=L_1$, that is $L_1'=L_1$);

For each synthetic wavelengths $\lambda_{Si}$, repeat Steps 2.1) and 2.2). When the wavelength $\lambda_2$ of the second laser 11 is changed every time, the moving displacement of the first cube-corner prism 22 is recorded as $\Delta l_i$. According to Eq. (4), the phase difference $\Delta \phi'''$ between the two interference signals during each measurement is changed to:

$$\Delta \varphi''' = 4\pi \left( \frac{L_R + L_i'}{\lambda_{Si}} + \frac{L_{Mi}}{\lambda_1} \right) \quad (8)$$

where $L_i'$ is the estimate value of the measured distance L, and $L_{Mi}$ is the distance between the second polarizing beam splitter 21 and the first cube-corner prism 22 with respect to the synthetic wavelength $\lambda_{Si}$;

In Eq. (8), when the measured distance L is larger than $\lambda_{Si}/2$, $\Delta \phi'''$ includes the integral number and the fractional part of $2\pi$. $\Delta \phi'''$ is expressed as another expression:

$$\Delta \varphi''' = 2\pi(M_{Si} + \varepsilon_{Si}) + 4\pi \left( \frac{L_R}{\lambda_{Si}} + \frac{L_{Mi}}{\lambda_1} \right) \quad (9)$$

According to Eq. (8) and Eq. (9), the estimate value $L_i'$ of the measured distance is expressed as:

$$L_i' = (M_{Si} + \varepsilon_{Si}) \cdot \frac{\lambda_{Si}}{2} \quad (10)$$

where $M_n$ and $\varepsilon_n$ respectively represent the integral fringe order and the fractional fringe order of the synthetic wavelength $\lambda_{Si}$ included in the measured distance;

Repeat Step 2.3). the coarse measurement value $L_i$ of the measured absolute distance corresponding to the fractional part of the synthetic wavelength $\lambda_{Si}$ is calculated by the computer 34 as follows:

$$L_i = \frac{\lambda_{Si}}{\lambda_1} \cdot \Delta l_i \quad (11)$$

The fractional fringe order of the synthetic wavelength $\lambda_{Si}$ included in the measured absolute distance L is given by:

$$\varepsilon_{Si} = \frac{2L_i}{\lambda_{Si}} \quad (12)$$

With the estimate value $L_{i-1}'$ of the measured absolute distance determined by last synthetic wavelength $\lambda_{Si-1}$ and the fractional fringe order $\varepsilon_{Si}$ currently determined, the integral fringe order $M_{Si}$ of the synthetic wavelength $\lambda_{Si}$ included in the measured absolute distance L is given by:

$$M_{Si} = \text{int}\left[ \frac{2L_{i-1}'}{\lambda_{Si}} + 0.5 - \varepsilon_{Si} \right] \quad (13)$$

where int[ ] is rounded down.

4) According to the synthetic wavelength $\lambda_{Si}$ and its fractional fringe order $\varepsilon_{Si}$ and integral fringe order $M_{Si}$ obtained in the above steps, the computer 34 calculates each estimate value of the measured absolute distance L during each measurement. The measured absolute distance L is obtained through calculation. Then the measurement of absolute distance using laser interferometric wavelength leverage is realized.

4.1) For $i=2, 3, \ldots, n$, substituting the obtained $M_{Si}$ and $\varepsilon_{Si}$ into Eq. (10), the estimate value $L_i'$ of the measured absolute distance corresponding to the synthetic wavelength $\lambda_{Si}$ is calculated by the computer 34;

Substituting Eq. (11) into Eq. (12), we get:

$$\varepsilon_{Si} = \frac{2\Delta l_i}{\lambda_1} \quad (14)$$

Substituting Eq. (14) into Eq. (10), we get:

$$L_i' = M_{Si} \cdot \frac{\lambda_{Si}}{2} + \frac{\lambda_{Si}}{\lambda_1} \cdot \Delta l_i \quad (15)$$

From Eq. (15), the measurement uncertainty of the estimate value $L_i'$ of the measured absolute distance is derived as follows:

$$u(L_i') = \sqrt{\left(\frac{M_{Si}}{2} \cdot u(\lambda_{Si})\right)^2 + \left(\frac{\lambda_{Si}}{\lambda_1} \cdot u(\Delta l_i)\right)^2 + \left(\frac{\Delta l_i}{\lambda_1} \cdot u(\lambda_{Si})\right)^2 + \left(\frac{\Delta l_i \lambda_{Si}}{\lambda_1^2} \cdot u(\lambda_1)\right)^2} \quad (16)$$

Equation (16) shows that the measurement uncertainty $u(L_i')$ of the estimate value $L_i'$ of the measured absolute distance depends on the integer value $M_{Si}$ of the synthetic wavelength $\lambda_{Si}$, the uncertainty $u(\lambda_{Si})$ of the synthetic wavelength $\lambda_{Si}$, the uncertainty $u(\lambda_1)$ of the wavelength $\lambda_1$ and the uncertainty $u(\Delta l_i)$ of the moving displacement $\Delta l_i$ of the first cube-corner prism 22;

For different i, repeat Step 2). When the condition of $4u(L_n') < \lambda_1$ is satisfied, the measured absolute distance is calculated by the computer 34 according to the following equation:

$$L = (M_n + \varepsilon_n) \cdot \frac{\lambda_1}{2} \quad (17)$$

where $M_n$ represents the integral fringe order of the wavelength $\lambda_1$ included in the measured absolute distance L, $\varepsilon_n$ represents the fractional fringe order of the wavelength $\lambda_1$ included in the measured absolute distance L, and $M_n$ and $\varepsilon_n$ are respectively calculated by using the following equations:

$$M_n = \text{int}\left[ \frac{2L_n'}{\lambda_1} + 0.5 - \varepsilon_n \right]$$

-continued $$\varepsilon_n = \frac{2\Delta l_n}{\lambda_1}$$

where $L_n'$ is the estimate value of the measured absolute distance L and $\Delta l_n$ is the moving displacement of the first cube-corner prism 22 in the final measurement.

For the case that the condition of $4u(L_n')<\lambda_1$ is not satisfied, Step 3) is continuously repeated until the condition of $4u(L_n')<\lambda_1$ is satisfied, then the measured absolute distance L is calculated by using Eq. (17).

The absolute distance of 50 m is measured as an example. When the wavelength $\lambda_1$ output from the first laser 10 is equal to 631 m, $u(\Delta l_i)$ is equal to 0.0004 μm, the relative uncertainty of the vacuum wavelengths $\lambda_{10}$ and $\lambda_{20}$ is $10^{-10}$ and the relative uncertainty of the measurement of the air refractive index is $10^{-9}$, the relative uncertainty of the wavelengths $\lambda_1$, $\lambda_2$ and $\lambda_{Si}$ in the air is $10^{-9}$, after measurements with four synthetic wavelengths are performed, the measurement uncertainty of the measured absolute distance reaches 0.04 μm, this satisfies the condition of $4u(L_n')<\lambda_1$. The specific data is shown in Table 1.

TABLE 1

Four synthetic wavelength values and corresponding measurement results when the measured absolute distance L = 50 m

| No. | Wavelength $\lambda_2$ (nm) | Synthetic wavelength $\lambda_{Si}$ (μm) | Moving displacement $\Delta l_i$ of first cube-corner prism 22 (μm) | Estimate value $L_i'$ of the absolute distance (μm) | Measurement uncertainty $u(L_i')$ (μm) | Relative measurement accuracy of the distance $L - L_i'/L$ |
|---|---|---|---|---|---|---|
| 1 | 631.0000020 | 199861638.70 | 0.1576 | 49917898.98 | 95021.38 | $1.64 \times 10^{-3}$ |
| 2 | 631.0002656 | 1498962.29 | 0.2248 | 49999775.43 | 712.66 | $4.49 \times 10^{-6}$ |
| 3 | 631.0332048 | 11991.70 | 0.0321 | 49999996.18 | 5.70 | $7.63 \times 10^{-8}$ |
| 4 | 635.6829255 | 85.65 | 0.1048 | 49999999.96 | 0.06 | $8.76 \times 10^{-10}$ |

According to Eq. (17), the measured absolute distance L=49999999.98 μm is obtained through calculation, and the relative accuracy of the measurement of the absolute distance is $3.54 \times 10^{-10}$.

From the above description, these show that the present invention has realized precision measurement of the absolute distance of large length. The present invention has the advantages of high measurement accuracy, simple optical configuration, convenient to use and remarkable technical effects.

The above embodiment is intended to explain the present invention, but not to limit the present invention. Any modification and change made to the present invention within the protection scope of the spirit and the Claims of the present invention fall in the protection scope of the present invention.

What is claimed is:

1. An absolute distance measurement apparatus using laser interferometric wavelength-leverage, comprising: a light source system (I), a wavelength-leverage laser interferometric system (II) and an interference signal processing and controlling system (III), wherein the light source system (I) outputs an orthogonally linearly polarized beam with the wavelength $\lambda_1$ and wavelength $\lambda_2$, the orthogonally linearly polarized beam projects onto the wavelength-leverage laser interferometric system (II) to form the interference beam, the interference beam projects onto the interference signal processing and controlling system (III), and a controller in the interference signal processing and controlling system (III) is used for controlling the change of the wavelength $\lambda_2$ in the light source system (I), wherein the light source system (I) comprises a first laser (10), a second laser (11), a first beam expander (12), a second beam expander (13), a first reflector (14) and a first polarizing beam splitter (15), wherein the linearly polarized beam with a constant wavelength $\lambda_1$ emitted from the first laser (10) passes through the first beam expander (12) and projects onto the first polarizing beam splitter (15), the linearly polarized beam with a variable wavelength $\lambda_2$ emitted from the second laser (11), whose polarization direction is perpendicular to that of the beam from the first laser (10), passes through the second beam expander (13), is reflected by the first reflector (14) and projects onto the first polarizing beam splitter (15), and the linearly polarized beam with the constant wavelength $\lambda_1$ transmitted by the first polarizing beam splitter (15) and the linearly polarized beam with the variable wavelength $\lambda_2$ reflected by the first polarizing beam splitter (15) and combined to form one orthogonally linearly polarized beam.

2. The absolute distance measurement apparatus using laser interferometric wavelength-leverage according to claim 1, wherein the wavelength-leverage laser interferometric system (II) comprises a first beam splitter (20), a second polarizing beam splitter (21), a first cube-corner prism (22), a second beam splitter (23), a first shutter (24), a second shutter (25), a second reflector (26), a third reflector (27), a third beam splitter (28), a second cube-corner prism (29) and a third cube-corner prism (210), wherein being incident on the first beam splitter (20), the orthogonally linearly polarized beam is divided into the reflected reference beam and the transmitted measurement beam, wherein the reflected reference beam projects onto the second polarizing beam splitter (21), wherein the linearly polarized beam with the wavelength $\lambda_2$ is reflected twice by the second polarizing beam splitter (21) and projects onto the first beam splitter (20), and the linearly polarized beam with the wavelength $\lambda_1$ passes through the second polarizing beam splitter (21), projects onto the first cube-corner prism (22), returns after being reflected, and projects onto the first beam splitter (20) after passing through the second polarizing beam splitter (21) again, wherein being incident on the second beam splitter (23), the transmitted measurement beam is divided into the reflected near-end measurement beam and the transmitted far-end measurement beam, wherein the near-end measurement beam projects onto the first beam splitter (20) after passing through the first shutter (24), the second reflector (26), the second cube-corner prism (29) and the third beam splitter (28) in sequence, and the far-end measurement beam projects onto the first beam splitter (20) after passing through the second shutter (25), the third cube-corner prism (210), the third reflector (27) and the third beam splitter (28) in sequence, wherein being reflected by the first beam splitter (20), the near-end or far-end measurement beam recombines with the reference beam transmitted by the first beam splitter (20) to form the interference beam.

3. The absolute distance measurement apparatus using laser interferometric wavelength-leverage according to claim 2, wherein in the wavelength-leverage laser interferometric system (II), a reference arm is composed of the second polarizing beam splitter (21) and the first cube-corner prism (22) while a measurement arm is composed of the second beam splitter (23), the first shutter (24), the second shutter (25), the second reflector (26), the third reflector (27), the third beam splitter (28), the second cube-corner prism (29) and the third cube-corner prism (210).

4. An absolute distance measurement method using laser interferometric wavelength-leverage applied to the apparatus according to claim 3, wherein the method adopts the apparatus to perform measurement, and the specific steps are as follows:
  1) The first laser (10) emits the linearly polarized beam with the wavelength $\lambda_1$, wherein controlling the second laser (11) to emit the linearly polarized beam with the wavelength $\lambda_2$ makes one half of the primary synthetic wavelength $\lambda_{S1}$ formed by the wavelengths $\lambda_1$ and $\lambda_2$ be larger than the measured absolute distance L which is the distance between the second cube-corner prism (29) and the third cube-corner prism (210);
  2) Adjust the open and close states of the first shutter (24) and the second shutter (25), move the first cube-corner prism (22) along the axial direction of light path, and establish a wavelength-leverage relationship, wherein the primary coarse measurement value of the measured absolute distance is achieved;
  3) Keep the wavelength $\lambda_1$ output from the first laser (10) constant, wherein the computer (34) changes the wavelength $\lambda_2$ output from the second laser (11) by means of the controller (35) so that the wavelength $\lambda_1$ and the wavelength $\lambda_2$ form a series of synthetic wavelengths $\lambda_{S2}, \lambda_{S3}, \ldots, \lambda_{Si}, \ldots, \lambda_{Sn}$, wherein the measurement is performed repeatedly with respect to each change of the wavelength $\lambda_2$, wherein the fractional fringe order $\epsilon_{Si}$ and the integral fringe order $M_{Si}$ of the synthetic wavelength $\lambda_{Si}$ included in the measured absolute distance L are obtained through calculation;
  4) According to the synthetic wavelength $\lambda_{Si}$ and its fractional fringe order $\epsilon_{Si}$ and integral fringe order $M_{Si}$ obtained in the above steps, the computer (34) calculates each estimate value of the measured absolute distance L during each measurement, wherein the measured absolute distance L is obtained through calculation, and then the measurement of absolute distance using laser interferometric wavelength-leverage is realized.

5. The absolute distance measurement apparatus using laser interferometric wavelength-leverage according to claim 2, wherein in the wavelength-leverage laser interferometric system (II), there is a one-to-one correspondence between the synthetic wavelength $\lambda_S$ formed by the linearly polarized beams with the wavelengths $\lambda_1$ and $\lambda_2$ in the measurement arm and the wavelength $\lambda_1$ of the linearly polarized beam projecting onto the first cube-corner prism (22) in the reference arm, wherein the measured absolute distance in the measurement arm and the moving displacement of the first cube-corner prism (22) in the reference arm form a leverage relationship.

6. An absolute distance measurement method using laser interferometric wavelength-leverage applied to the apparatus according to claim 5, wherein the method adopts the apparatus to perform measurement, and the specific steps are as follows:
  1) The first laser (10) emits the linearly polarized beam with the wavelength $\lambda_1$, wherein controlling the second laser (11) to emit the linearly polarized beam with the wavelength $\lambda_2$ makes one half of the primary synthetic wavelength $\lambda_{S1}$ formed by the wavelengths $\lambda_1$ and $\lambda_2$ be larger than the measured absolute distance L which is the distance between the second cube-corner prism (29) and the third cube-corner prism (210);
  2) Adjust the open and close states of the first shutter (24) and the second shutter (25), move the first cube-corner prism (22) along the axial direction of light path, and establish a wavelength-leverage relationship, wherein the primary coarse measurement value of the measured absolute distance is achieved;
  3) Keep the wavelength $\lambda_1$ output from the first laser (10) constant, wherein the computer (34) changes the wavelength $\lambda_2$ output from the second laser (11) by means of the controller (35) so that the wavelength $\lambda_1$ and the wavelength $\lambda_2$ form a series of synthetic wavelengths $\lambda_{S2}, \lambda_{S3}, \ldots, \lambda_{Si}, \ldots, \lambda_{Sn}$, wherein the measurement is performed repeatedly with respect to each change of the wavelength $\lambda_2$, wherein the fractional fringe order $\epsilon_{Si}$ and the integral fringe order $M_{Si}$ of the synthetic wavelength $\lambda_{Si}$ included in the measured absolute distance L are obtained through calculation;
  4) According to the synthetic wavelength $\lambda_{Si}$ and its fractional fringe order $\epsilon_{Si}$ and integral fringe order $M_{Si}$ obtained in the above steps, the computer (34) calculates each estimate value of the measured absolute distance L during each measurement, wherein the measured absolute distance L is obtained through calculation, and then the measurement of absolute distance using laser interferometric wavelength-leverage is realized.

7. An absolute distance measurement method using laser interferometric wavelength-leverage applied to the apparatus according to claim 2, wherein the method adopts the apparatus to perform measurement, and the specific steps are as follows:
  1) The first laser (10) emits the linearly polarized beam with the wavelength $\lambda_1$, wherein controlling the second laser (11) to emit the linearly polarized beam with the wavelength $\lambda_2$ makes one half of the primary synthetic wavelength $\lambda_{S1}$ formed by the wavelengths $\lambda_1$ and $\lambda_2$ be larger than the measured absolute distance L which is the distance between the second cube-corner prism (29) and the third cube-corner prism (210);
  2) Adjust the open and close states of the first shutter (24) and the second shutter (25), move the first cube-corner prism (22) along the axial direction of light path, and establish a wavelength-leverage relationship, wherein the primary coarse measurement value of the measured absolute distance is achieved;
  3) Keep the wavelength $\lambda_1$ output from the first laser (10) constant, wherein the computer (34) changes the wavelength $\lambda_2$ output from the second laser (11) by means of the controller (35) so that the wavelength $\lambda_1$ and the wavelength $\lambda_2$ form a series of synthetic wavelengths $\lambda_{S2}, \lambda_{S3}, \ldots, \lambda_{Si}, \ldots, \lambda_{Sn}$, wherein the measurement is performed repeatedly with respect to each change of the wavelength $\lambda_2$, wherein the fractional fringe order $\epsilon_{Si}$ and the integral fringe order $M_{Si}$ of the synthetic wavelength $\lambda_{Si}$ included in the measured absolute distance L are obtained through calculation;

4) According to the synthetic wavelength $\lambda_{Si}$ and its fractional fringe order $\epsilon_{Si}$ and integral fringe order $M_{Si}$ obtained in the above steps, the computer (34) calculates each estimate value of the measured absolute distance L during each measurement, wherein the measured absolute distance L is obtained through calculation, and then the measurement of absolute distance using laser interferometric wavelength-leverage is realized.

8. The absolute distance measurement apparatus using laser interferometric wavelength-leverage according to claim 1, wherein the interference signal processing and controlling system (Ill) comprises a third polarizing beam splitter (30), a first photodetector (31), a second photodetector (32), a data acquisition module (33), a computer (34) and the controller (35), wherein the interference beam from the wavelength-leverage laser interferometric system (II) projects onto the third polarizing beam splitter (30), wherein the interference beam with the wavelength $\lambda_2$ reflected by the third polarizing beam splitter (30) is received by the first photodetector (31), and the interference beam with the wavelength $\lambda_1$ transmitted by the third polarizing beam splitter (30) is received by the second photodetector (32), wherein the interference signals output by the two photodetectors are respectively sent to the data acquisition module (33), and then transmitted to the computer (34) after being processed by the data acquisition module (33), wherein according to the calculated result, the computer (34) changes the value of the wavelength $\lambda_2$ emitted from the second laser (11) by means of the controller (35).

9. An absolute distance measurement method using laser interferometric wavelength-leverage applied to the apparatus according to claim 8, wherein the method adopts the apparatus to perform measurement, and the specific steps are as follows:

1) The first laser (10) emits the linearly polarized beam with the wavelength $\lambda_1$, wherein controlling the second laser (11) to emit the linearly polarized beam with the wavelength $\lambda_2$ makes one half of the primary synthetic wavelength $\lambda_{S1}$ formed by the wavelengths $\lambda_1$ and $\lambda_2$ be larger than the measured absolute distance L which is the distance between the second cube-corner prism (29) and the third cube-corner prism (210);

2) Adjust the open and close states of the first shutter (24) and the second shutter (25), move the first cube-corner prism (22) along the axial direction of light path, and establish a wavelength-leverage relationship, wherein the primary coarse measurement value of the measured absolute distance is achieved;

3) Keep the wavelength $\lambda_1$ output from the first laser (10) constant, wherein the computer (34) changes the wavelength $\lambda_2$ output from the second laser (11) by means of the controller (35) so that the wavelength $\lambda_1$ and the wavelength $\lambda_2$ form a series of synthetic wavelengths $\lambda_{S2}, \lambda_{S3}, \ldots, \lambda_{Si}, \ldots, \lambda_{Sn}$, wherein the measurement is performed repeatedly with respect to each change of the wavelength $\lambda_2$, wherein the fractional fringe order $\epsilon_{Si}$ and the integral fringe order $M_{Si}$ of the synthetic wavelength $\lambda_{Si}$ included in the measured absolute distance L are obtained through calculation;

4) According to the synthetic wavelength $\lambda_{Si}$ and its fractional fringe order $\epsilon_{Si}$ and integral fringe order $M_{Si}$ obtained in the above steps, the computer (34) calculates each estimate value of the measured absolute distance L during each measurement, wherein the measured absolute distance L is obtained through calculation, and then the measurement of absolute distance using laser interferometric wavelength-leverage is realized.

10. An absolute distance measurement method using laser interferometric wavelength-leverage applied to the apparatus according to claim 1, wherein the method adopts the apparatus to perform measurement, and the specific steps are as follows:

1) The first laser (10) emits the linearly polarized beam with the wavelength $\lambda_1$, wherein controlling the second laser (11) to emit the linearly polarized beam with the wavelength $\lambda_2$ makes one half of the primary synthetic wavelength $\lambda_{S1}$ formed by the wavelengths $\lambda_1$ and $\lambda_2$ be larger than the measured absolute distance L which is the distance between the second cube-corner prism (29) and the third cube-corner prism (210);

2) Adjust the open and close states of the first shutter (24) and the second shutter (25), move the first cube-corner prism (22) along the axial direction of light path, and establish a wavelength-leverage relationship, wherein the primary coarse measurement value of the measured absolute distance is achieved;

3) Keep the wavelength $\lambda_1$ output from the first laser (10) constant, wherein the computer (34) changes the wavelength $\lambda_2$ output from the second laser (11) by means of the controller (35) so that the wavelength $\lambda_1$ and the wavelength $\lambda_2$ form a series of synthetic wavelengths $\lambda_{S2}, \lambda_{S3}, \ldots, \lambda_{Si}, \ldots, \lambda_{Sn}$, wherein the measurement is performed repeatedly with respect to each change of the wavelength $\lambda_2$, wherein the fractional fringe order $\epsilon_{Si}$ and the integral fringe order $M_{Si}$ of the synthetic wavelength $\lambda_{Si}$ included in the measured absolute distance L are obtained through calculation;

4) According to the synthetic wavelength $\lambda_{Si}$ and its fractional fringe order $\epsilon_{Si}$ and integral fringe order $M_{Si}$ obtained in the above steps, the computer (34) calculates each estimate value of the measured absolute distance L during each measurement, wherein the measured absolute distance L is obtained through calculation, and then the measurement of absolute distance using laser interferometric wavelength-leverage is realized.

11. The absolute distance measurement method using laser interferometric wavelength-leverage applied to the apparatus according to claim 10, wherein Step 2) specifically includes:

2.1) When the first shutter (24) is opened and the second shutter (25) is closed, the near-end measurement beam returned from the second cube-corner prism (29) and the reference beam form the interference signals, and moving the first cube-corner prism (22) along the axial direction of light path makes the phase difference $\Delta\phi$ between the interference signals of wavelengths $\lambda_2$ and $\lambda_1$ detected respectively by the first photodetector (31) and the second photodetector (32) be equal to zero;

2.2) When the first shutter (24) is closed and the second shutter (25) is opened, the far-end measurement beam returned from the third cube-corner prism (210) and the reference beam form the interference signals, wherein the phase difference $\Delta\phi$ between the two interference signals received by the first photodetector (31) and the second photodetector (32) is changed, moving again the first cube-corner prism (22) along the axial direction of light path makes the phase difference $\Delta\phi$ be equal to zero, wherein the moving displacement of the first cube-corner prism (22) is recorded as $\Delta l$;

2.3) The wavelength-leverage relationship among the primary synthetic wavelength $\lambda_{S1}$, the wavelength $\lambda_1$ output from the first laser (10), the measured absolute distance L and the moving displacement $\Delta l$ of the first cube-corner prism (22) is established as follows:

$$\frac{L}{\lambda_{S1}} = \frac{\Delta l}{\lambda_1}$$

where $\lambda_{S1}=\lambda_1\lambda_2/|\lambda_1-\lambda_2|$ is the primary synthetic wavelength formed by the wavelengths $\lambda_1$ and $\lambda_2$, wherein $\lambda_1$ and $\lambda_2$ are the wavelengths output from the first laser (10) and the second laser (11), respectively;

2.4) According to the wavelength-leverage relationship, the primary coarse measurement value $L_1$ of the measured absolute distance is calculated by the computer (34) using the following equation:

$$L_1 = \frac{\lambda_{S1}}{\lambda_1} \cdot \Delta l.$$

12. The absolute distance measurement method using laser interferometric wavelength-leverage applied to the apparatus according to claim 10, wherein Step 3) specifically includes:

3.1) A series of synthetic wavelengths meets $\lambda_{S2}>\lambda_{S3}>\ldots>\lambda_{Sn}$, and each synthetic wavelength $\lambda_{Si}$ meets $$\lambda_{Si}>4u(L_{i-1}'),\ i=2,3,\ldots,n$$

where i represents the sequence number of measurement times, n represents the total number of measurement times, $L_{i-1}'$ is the estimate value of the measured distance, and $u(L_{i-1}')$ is the measurement uncertainty of the estimate value $L_{i-1}'$ of the measured distance when the synthetic wavelength is $\lambda_{Si-1}$; when i=2, $L_{i-1}'=L_1$, namely $L_1'=L_1$;

3.2) For each synthetic wavelength $\lambda_{Si}$, repeat Step 2), when the wavelength $\lambda_2$ of the second laser (11) is changed, the moving displacement of the first cube-corner prism (22) is recorded as $\Delta l_i$ during each measurement, wherein the following approach is adopted to perform measurement during each measurement:

According to the wavelength-leverage relationship, the coarse measurement value $L_i$ of the measured absolute distance corresponding to the fractional part of the synthetic wavelength $\lambda_{Si}$ is calculated by the computer (34) using the following equation:

$$L_i = \frac{\lambda_{Si}}{\lambda_1} \cdot \Delta l_i$$

With the coarse measurement value $L_i$ of the measured absolute distance, the fractional fringe order $\epsilon_{Si}$ of the synthetic wavelength $\lambda_{Si}$ included in the measured absolute distance L is calculated by the computer (34) using the following equation:

$$\varepsilon_{Si} = \frac{2L_i}{\lambda_{Si}}$$

3.3) Then, with the estimate value $L_{i-1}'$ of the measured absolute distance and the fractional fringe order $\epsilon_{Si}$ of the synthetic wavelength $\lambda_{Si}$, the integral fringe order $M_{Si}$ of the synthetic wavelength $\lambda_{Si}$ included in the measured absolute distance is calculated by the computer (34) using the following equation:

$$M_{Si} = \text{int}\left[\frac{2L_{i-1}'}{\lambda_{Si}} + 0.5 - \varepsilon_{Si}\right]$$

where int[ ] is rounded down.

13. The absolute distance measurement method using laser interferometric wavelength-leverage applied to the apparatus according to claim 10, wherein Step 4) specifically includes:

4.1) For the measuring process with respect to i=2, 3, . . . , n, each estimate value $L_i'$ of the measured absolute distance L is calculated by the computer (34) using the following equation:

$$L_i' = (M_{Si} + \varepsilon_{Si}) \cdot \frac{\lambda_{Si}}{2}$$

When $4u(L_n')<\lambda_1$ is satisfied, where $u(L_n')$ is the measurement uncertainty of the estimate value $L_n'$ of the measured absolute distance when the final synthetic wavelength is $\lambda_{Sn}$, the measured absolute distance L is calculated by the computer (34) using the following equation:

$$L = (M_n + \varepsilon_n) \cdot \frac{\lambda_1}{2}$$

where $M_n$ represents the integral fringe order of the wavelength $\lambda_1$ included in the measured absolute distance L, $\epsilon_n$ represents the fractional fringe order of the wavelength $\lambda_1$ included in the measured absolute distance L, and $M_n$ and $\epsilon_n$ are respectively calculated by using the following equations:

$$M_n = \text{int}\left[\frac{2L_n'}{\lambda_1} + 0.5 - \varepsilon_n\right]$$

$$\varepsilon_n = \frac{2\Delta l_n}{\lambda_1}$$

where $L_n'$ is the estimate value of the measured absolute distance L and $\lambda l_n$ is the moving displacement of the first cube-corner prism (22) in the final measurement.

* * * * *